United States Patent
Yashiki et al.

(10) Patent No.: US 10,648,622 B2
(45) Date of Patent: May 12, 2020

(54) PIPELINE NETWORK DIAGNOSING DEVICE

(71) Applicant: Hitachi Industrial Equipment Systems Co., Ltd., Chiyoda-ku, Tokyo (JP)

(72) Inventors: Tatsurou Yashiki, Tokyo (JP); Yaping Liu, Tokyo (JP); Yukinori Katagiri, Tokyo (JP); Hisanori Matsumoto, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 15/557,569

(22) PCT Filed: Jan. 22, 2016

(86) PCT No.: PCT/JP2016/051763
§ 371 (c)(1),
(2) Date: Sep. 12, 2017

(87) PCT Pub. No.: WO2016/147696
PCT Pub. Date: Sep. 22, 2016

(65) Prior Publication Data
US 2018/0051853 A1    Feb. 22, 2018

(30) Foreign Application Priority Data
Mar. 13, 2015 (JP) ................. 2015-050157

(51) Int. Cl.
*G01M 3/28* (2006.01)
*F17D 5/02* (2006.01)
(Continued)

(52) U.S. Cl.
CPC ............. *F17D 5/02* (2013.01); *G01M 3/2815* (2013.01); *G05B 23/02* (2013.01); *G16Z 99/00* (2019.02)

(58) Field of Classification Search
CPC ............................... F17D 5/02; G01M 3/2815
See application file for complete search history.

(56) References Cited

U.S. PATENT DOCUMENTS 4,704,897 A * 11/1987 Kawase .................. G01M 3/22
73/40.5 R
4,977,517 A * 12/1990 Gibbs, Jr. .............. G01N 15/12
128/DIG. 13
(Continued)

FOREIGN PATENT DOCUMENTS

CN          101672748 A      3/2010
CN          103486443 A      1/2014
(Continued)

OTHER PUBLICATIONS

International Search Report (PCT/ISA/210) issued in PCT Application No. PCT/JP2016/051763 dated Mar. 15, 2016 with English translation (Two (2) pages).
(Continued)

*Primary Examiner* — Lisa M Caputo
*Assistant Examiner* — Alex T DeVito
(74) *Attorney, Agent, or Firm* — Crowell & Moring LLP

(57) ABSTRACT

Provided is a pipeline network diagnosing device in which: a pressure measurement value is stored upon being acquired by a pressure gauge; a pipeline network is divided into sub-networks at the installation positions of an air compressor, a terminal device, and a pressure gauge installed partway along a pipeline channel, after which a sub-network model is generated; the flow of air within a sharing sub-network configured from two sub-networks that share the pressure gauge is calculated and stored, the pressure measurement value at an end part of the sharing sub-network serving as a calculation criterion; the pressure measurement value and a pressure calculation value at a shared pressure measurement point are compared to each other, the shared pressure measurement point being a pressure measurement point shared by the two sub-networks within the sharing sub-network; an assessment is made for each of the sub-networks with regard to whether air has leaked or a device
(Continued)

has clogged; and any sub-networks in which air leakage or device clogging is assessed to have occurred are displayed on a display device using the results of the aforementioned assessment.

3 Claims, 13 Drawing Sheets

(51) Int. Cl.
*G05B 23/02* (2006.01)
*G16Z 99/00* (2019.01)

(56) References Cited

U.S. PATENT DOCUMENTS

| | | | |
|---|---|---|---|
| 6,970,808 | B2 | 11/2005 | Abhulimen et al. |
| 2005/0246112 | A1 | 11/2005 | Abhulimen et al. |

FOREIGN PATENT DOCUMENTS

| | | | |
|---|---|---|---|
| CN | 104237917 | A | 12/2014 |
| GB | 2 181 259 | A | 4/1987 |
| JP | 4-312300 | A | 11/1992 |
| JP | 7-140033 | A | 6/1995 |
| JP | 9-21500 | A | 1/1997 |
| JP | 2011-54209 | A | 3/2011 |

OTHER PUBLICATIONS

Japanese-language Written Opinion (PCT/ISA/237) issued in PCT Application No. PCT/JP2016/051763 dated Mar. 15, 2016.
Extended European Search Report issued in counterpart European Application No. 16764527.4 dated Oct. 19, 2018 (eight pages).
Chinese-language Office Action issued in counterpart Chinese Application No. 201680015442 dated Apr. 1, 2019 with English translation (13 pages).

* cited by examiner

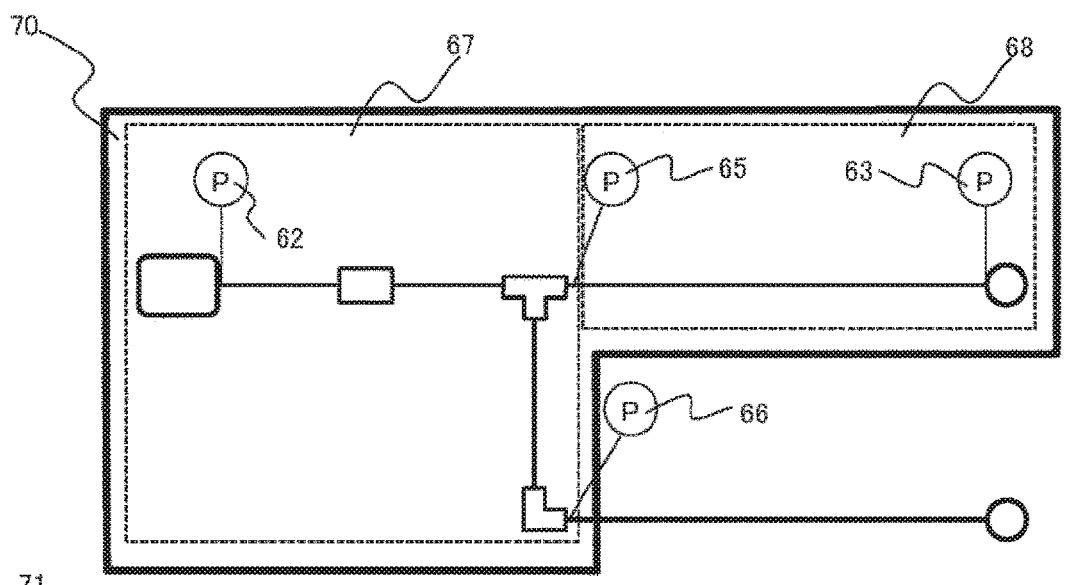
FIG. 4A
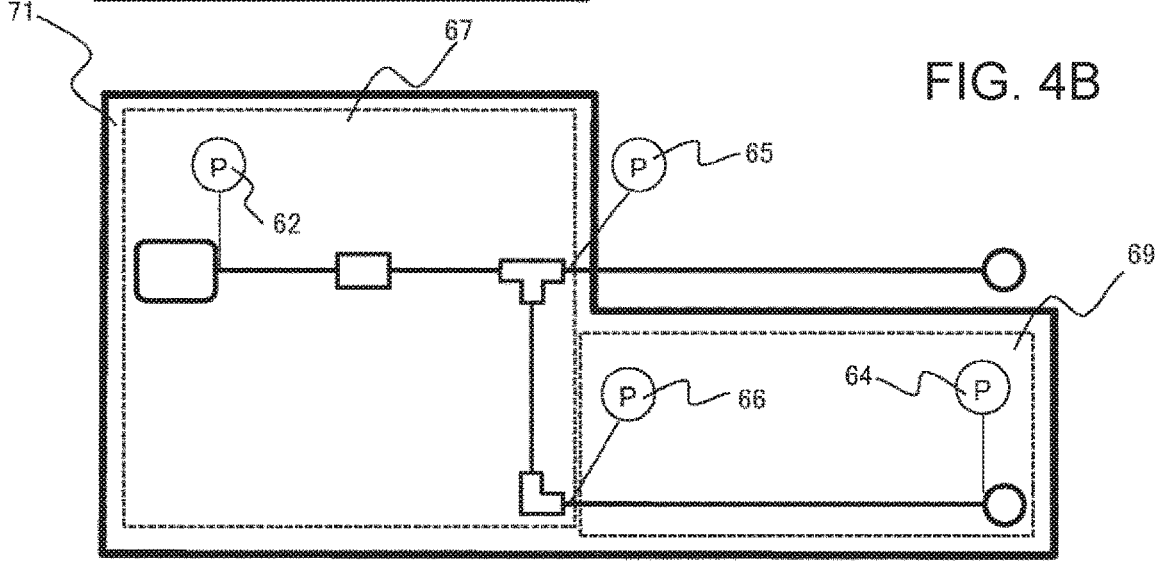
FIG. 4B
FIG. 4C
| SHARED SUB-NETWORK | SUB-NETWORK | CALCULATION CONDITION PRESSURE MEASURE-MENT POINT | SHARED PRESSURE MEASUREMENT POINT |
|---|---|---|---|
| SHARED SUB-NETWORK 70 | SUB-NETWORK 67 SUB-NETWORK 68 | PRESSURE GAUGE 62 PRESSURE GAUGE 63 PRESSURE GAUGE 66 | PRESSURE GAUGE 65 |
| SHARED SUB-NETWORK 71 | SUB-NETWORK 67 SUB-NETWORK 69 | PRESSURE GAUGE 62 PRESSURE GAUGE 64 PRESSURE GAUGE 65 | PRESSURE GAUGE 66 |

FIG.9

| SUB-NETWORK | SHARED PRESSURE MEASUREMENT POINT | RELATIONSHIP BETWEEN PRESSURE MEASUREMENT VALUE AND PRESSURE CALCULATION VALUE | DETERMINATION RESULT |
|---|---|---|---|
| SUB-NETWORK 67 | PRESSURE GAUGE 65 | PRESSURE CALCULATION VALUE - PRESSURE MEASUREMENT VALUE > THRESHOLD VALUE | ABSENCE OF AIR LEAKAGE OCCURRENCE/DEVICE CLOGGING |
| | PRESSURE GAUGE 66 | PRESSURE MEASUREMENT VALUE - PRESSURE CALCULATION VALUE ≤ THRESHOLD VALUE  PRESSURE CALCULATION VALUE - PRESSURE MEASUREMENT VALUE ≤ THRESHOLD VALUE | |
| SUB-NETWORK 68 | PRESSURE GAUGE 65 | PRESSURE CALCULATION VALUE - PRESSURE MEASUREMENT VALUE > THRESHOLD VALUE | PRESENCE OF AIR LEAKAGE OCCURRENCE |
| SUB-NETWORK 69 | PRESSURE GAUGE 66 | PRESSURE MEASUREMENT VALUE - PRESSURE CALCULATION VALUE ≤ THRESHOLD VALUE  PRESSURE CALCULATION VALUE - PRESSURE MEASUREMENT VALUE ≤ THRESHOLD VALUE | ABSENCE OF AIR LEAKAGE OCCURRENCE/DEVICE CLOGGING |

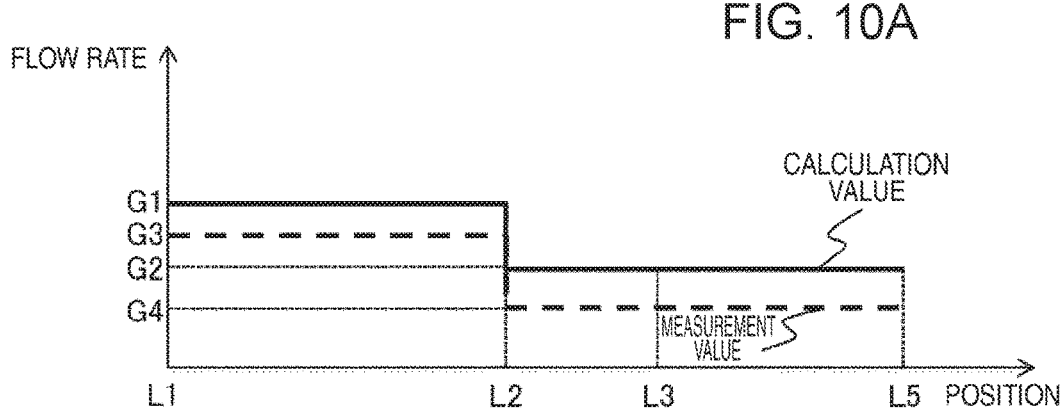

FIG. 10A

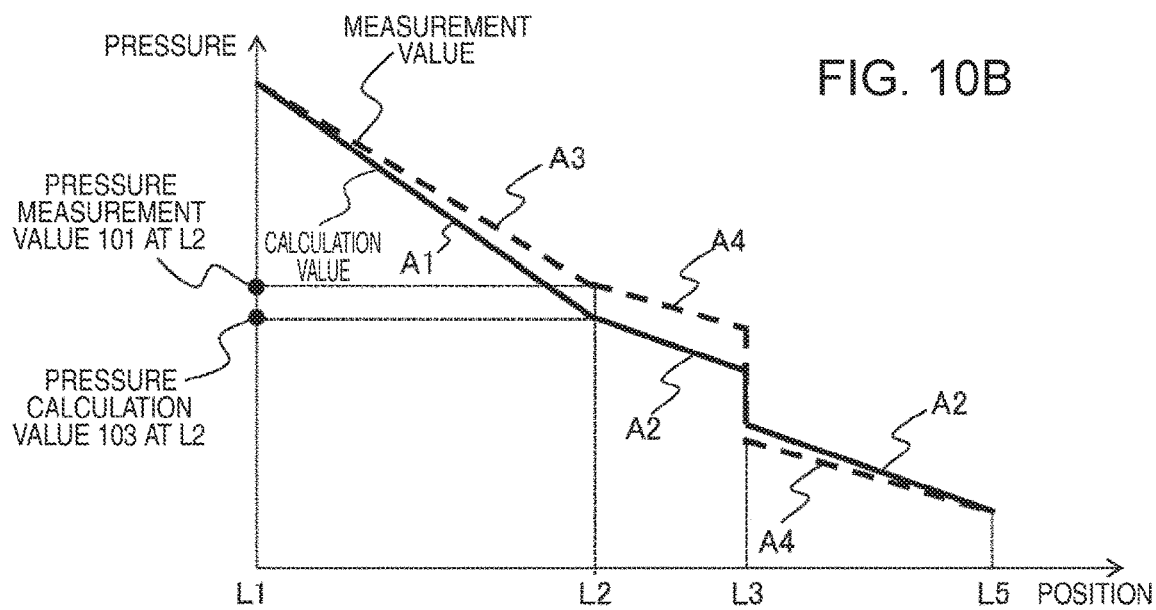

| SUB-NETWORK | SHARED PRESSURE MEASUREMENT POINT | RELATIONSHIP BETWEEN PRESSURE MEASUREMENT VALUE AND PRESSURE CALCULATION VALUE | DETERMINATION RESULT |
|---|---|---|---|
| SUB-NETWORK 67 | PRESSURE GAUGE 65 | PRESSURE CALCULATION VALUE - PRESSURE MEASUREMENT VALUE > THRESHOLD VALUE | ABSENCE OF AIR LEAKAGE OCCURRENCE/DEVICE CLOGGING |
| | PRESSURE GAUGE 66 | PRESSURE MEASUREMENT VALUE - PRESSURE CALCULATION VALUE ≤ THRESHOLD VALUE PRESSURE CALCULATION VALUE - PRESSURE MEASUREMENT VALUE ≤ THRESHOLD VALUE | |
| SUB-NETWORK 68 | PRESSURE GAUGE 65 | PRESSURE CALCULATION VALUE - PRESSURE MEASUREMENT VALUE > THRESHOLD VALUE | PRESENCE OF DEVICE CLOGGING |
| SUB-NETWORK 69 | PRESSURE GAUGE 66 | PRESSURE MEASUREMENT VALUE - PRESSURE CALCULATION VALUE ≤ THRESHOLD VALUE PRESSURE CALCULATION VALUE - PRESSURE MEASUREMENT VALUE ≤ THRESHOLD VALUE | ABSENCE OF AIR LEAKAGE OCCURRENCE/DEVICE CLOGGING |

FIG.13

| SUB-NETWORK | SHARED PRESSURE MEASUREMENT POINT | MEASUREMENT TIME | SUBTRACTION RESULT |
|---|---|---|---|
| SUB-NETWORK 1 | PRESSURE GAUGE WW1 | MEASUREMENT TIME = XX1 | $\Delta P1=YY1$<br>$\Delta P2=ZZ1$ |
| | | MEASUREMENT TIME = XX2 | $\Delta P1=YY2$<br>$\Delta P2=ZZ2$ |
| | | ⋮ | ⋮ |
| | ⋮ | ⋮ | ⋮ |
| SUB-NETWORK 2 | PRESSURE GAUGE WW2 | MEASUREMENT TIME = XX1 | $\Delta P1=YY3$<br>$\Delta P2=ZZ3$ |
| | | MEASUREMENT TIME = XX2 | $\Delta P1=YY4$<br>$\Delta P2=ZZ4$ |
| | | ⋮ | ⋮ |
| | ⋮ | ⋮ | ⋮ |
| ⋮ | ⋮ | ⋮ | ⋮ |

PIPELINE NETWORK DIAGNOSING DEVICE

TECHNICAL FIELD

The present invention relates to a pipeline network diagnosing device for diagnosing an air leakage and a device clogging state of an air pipeline network provided in a factory.

BACKGROUND ART

Recently, in the trend of power consumption reduction such as global warming prevention and energy saving laws, it is also required to reduce power consumption at factories. Since compressed air obtained by compressing air in the atmosphere can be used around us, compressed air is widely used as a power source for driving a pneumatic tool, a pneumatic press, an air brake, a spray gun, and the like. Hereafter, devices driven by compressed air are collectively referred to as end devices. Compressed air is compressed by an air compressor and supplied to an end device via a pipeline network provided in a factory. It is said that the power consumption of the air compressor accounts for 20 to 30% of the total power consumption of the factory. It is thus necessary to reduce the power consumption of the air compressor so as to save energy at the factory.

In the process of supplying the compressed air from the compressor to each of the end devices via the pipeline network, air leakage may occur in the pipeline network due to aged deterioration of an air pipeline, a gap occurring in a pipeline joint and a curved part and the like. In some cases, an air leakage amount reaches 10 to 20% of an air consumption amount of a factory. In order to reduce the power consumption of the air compressor, it is important to grasp an air leakage amount and a leakage position and take measures against leakage.

In such a pipeline network, as an air leakage diagnosing device for grasping an air leakage amount and a leakage position in such a pipeline network, Patent Literature 1 discloses an air leakage diagnosing technique capable of acquiring an air leakage amount and a leakage position by calculating a flow of air in a pipeline network and by solving an optimization problem that minimizes an objective function defined from the calculation value and a measurement value.

CITATION LIST

Patent Literature

PATENT LITERATURE 1: Japanese Patent Application Laid-Open No. 2011-54209

SUMMARY OF INVENTION

Technical Problem

In Patent Literature 1, a user inputs air leakage position candidates in a pipeline network and solves the above-described optimization problem, thereby determining an air leakage position. However, in order for the user to appropriately input the air leakage position candidates, it is required to grasp a state of aged deterioration of a target pipeline network facility, a place where a gap can occur, or the like in advance. In addition, in order to solve the optimization problem, it is usual to use a solution based on convergence calculation of genetic algorithm or the like, and in the case of a large-scale pipeline network, there is a problem that it takes much time to calculate an air leakage amount and a leakage position.

Furthermore, diagnostic items required for the pipeline network include, in addition to the above-described air leakage, device clogging of a filter, a dryer, and the like. Since fine particles in the atmosphere, oil components output from an air compressor, rust generated in a pipeline, and the like are mixed in the compressed air, a filter is installed in the pipeline network for the purpose of removing these contaminating components. Inside the filter, clogging progresses due to adhesion of the contaminating components with the passage of time, and a pressure loss increases. In addition to the filter, a dryer is installed for the purpose of removing moisture in the compressed air. Even inside the dryer, an adsorbent that adsorbs moisture deteriorates with the passage of time, and a pressure loss increases. As the pressure loss increases by 0.1 MPa, the power consumption of the air compressor increases by about 7%.

Thus, in order to reduce the power consumption of the air compressor, it is important to grasp the device clogging states of the filter, the dryer, and the like. However, the technique disclosed in Patent Literature 1 has a problem that cannot grasp the device clogging state.

In addition, as described above, the air leakage occurrence is often caused by deterioration of an air pipeline, and device clogging is caused by aged deterioration of devices. In a case where it is caused by aged deterioration of the air pipeline and the device, the air leakage occurrence and the device clogging gradually progress with the passage of time. Thus, it is important to repair or replace the aged-deteriorated air pipeline and device at an appropriate timing. However, the technique disclosed in Patent Literature 1 also has a problem that cannot grasp the progress status of the aged deterioration of the air pipeline and the device. Although the progress status of the aged deterioration of the air pipeline and the device can be diagnosed by existing techniques (for example, a nondestructive inspection apparatus such as an ultrasonic thickness gauge), there was a problem that it takes a lot of time to diagnose aged deterioration of air pipelines and devices with respect to the entire pipeline network.

The present invention has been made in view of the above circumstances, and an object of the present invention is to provide a pipeline network diagnosing device that does not require a user's input of air leakage position candidates and can grasp air leakage positions and device clogging states inside the pipeline network in a short calculation time even with respect to a large-scale pipeline network. Furthermore, another object of the present invention is to provide a pipeline network diagnosing device that is capable of grasping the progress status of aged deterioration of air pipelines and devices and determining the repair or replacement timings of the air pipelines and the devices.

Solution to Problem

In order to achieve the above object, the present invention provides a pipeline network diagnosing device including: a measurement value acquisition unit configured to acquire a pressure measurement value from a pressure gauge installed in a pipeline network; a measurement value storage unit configured to store the pressure measurement value; a pipeline network division unit configured to divide the pipeline network into sub-networks, which are partial regions of the pipeline network, at installation positions of an air compressor, end devices, and the pressure gauge installed on a pipeline route in the pipeline network with respect to the pipeline network; a sub-network model generation unit configured to generate a sub-network model including data for calculating a flow of air in the sub-network for each of the sub-networks; a sub-network model storage unit configured to store the sub-network model; a pressure/flow rate calculation unit configured to calculate a flow of air from the pressure measurement value and the sub-network model in a shared sub-network by using the pressure measurement value as a calculation condition at an end of the shared sub-network with respect to the shared sub-network which is a partial region including two sub-networks sharing the pressure gauge installed in the pipeline route in the pipeline network, and output a pressure calculation value at a pressure measurement point; a calculation value storage unit configured to store the pressure calculation value; an air leakage occurrence/device clogging region determination unit configured to compare the pressure measurement value at a shared pressure measurement point with the pressure calculation value with respect to the shared pressure measurement point shared by the two sub-networks in the shared sub-network, determine a presence or absence of air leakage occurrence and device clogging with respect to each of the sub-networks, and output a determination result; and an air leakage occurrence/device clogging region display unit including a display device and configured to display, on the display device, the sub-network in which air leakage and device clogging are determined as having occurred, by using the determination result.

In addition, in order to achieve the above object, the present invention provides a pipeline network diagnosing device including: a measurement value acquisition unit configured to acquire a pressure measurement value from a pressure gauge installed in a pipeline network; a measurement value acquisition timing determination unit configured to determine whether or not a current time is matched with a measurement value acquisition timing, and when matched, issue a measurement value acquisition command to the measurement value acquisition unit; a measurement value storage unit configured to store the pressure measurement value; a pipeline network division unit configured to divide the pipeline network into sub-networks at installation positions of an air compressor, end devices, and the pressure gauge installed on a pipeline route in the pipeline network with respect to the pipeline network; a sub-network model generation unit configured to generate a sub-network model with respect to each of the sub-networks; a sub-network model storage unit configured to store the sub-network model; a pressure/flow rate calculation unit configured to calculate a flow of air from the pressure measurement value and the sub-network model in a shared sub-network by using the pressure measurement value as a calculation condition at an end of the shared sub-network with respect to the shared sub-network, and output a pressure calculation value at a pressure measurement point; a calculation value storage unit configured to store the pressure calculation value; a measurement value/calculation value comparison unit configured to subtract the pressure calculation value from the pressure measurement value and subtract the pressure calculation value from the pressure measurement value at the shared pressure measurement point included in the sub-network, with respect to each of the sub-networks, and output a subtraction result; a measurement value/calculation value comparison result history storage unit configured to store a comparison result history which is data constituted in association with the sub-network, the shared pressure measurement point included in the sub-network, an acquisition time of the pressure measurement value, and the subtraction result; an air leakage occurrence/device clogging progress degree estimation unit configured to estimate a progress degree of air leakage occurrence and device clogging with respect to each of the sub-networks, based on the comparison result history, and output a progress degree estimation result; an air leakage occurrence/device clogging progress degree display unit including a display device and configured to display, on the display device, a progress degree of air leakage occurrence/device clogging with respect to each of the sub-networks by using the progress degree estimation result; and a diagnosis completion determination unit including an input device and configured to complete pipeline network diagnosis processing when a diagnosis completion command is input from the input device.

Advantageous Effects of Invention

According to the present invention, a user's input of air leakage position candidates is not required and it is possible to grasp air leakage positions and device clogging states inside the pipeline network in a short calculation time even for a large-scale pipeline network. Furthermore, it is possible to grasp how the air pipeline and the devices have been deteriorated, that is, how the aged deterioration has advance, and to determine the repair or replacement timings of the air pipelines and the devices

BRIEF DESCRIPTION OF DRAWINGS

FIGS. 4A to 4C are relation diagrams of shared sub-networks to be calculated, sub-networks constituting the shared sub-networks, pressure measurement points used as calculation conditions, and shared pressure measurement points, according to the first embodiment of the present invention.

FIG. 9 is a diagram illustrating air leakage occurrence and device clogging regions in a case where air leakage occurs, according to the first embodiment of the present invention.

FIGS. 10A and 10B are diagrams illustrating a flow rate change and a pressure change in a pipeline network in a case where there is device clogging, according to the first embodiment of the present invention.

FIG. 11 is a diagram illustrating air leakage occurrence and device clogging regions in a case where there is device clogging, according to the first embodiment of the present invention.

FIG. 13 is a data configuration diagram of a comparison result history according to the second embodiment of the present invention.

DESCRIPTION OF EMBODIMENTS

Hereinafter, embodiments of the present invention will be described with reference to the drawings.

Embodiment 1

Figure 1:
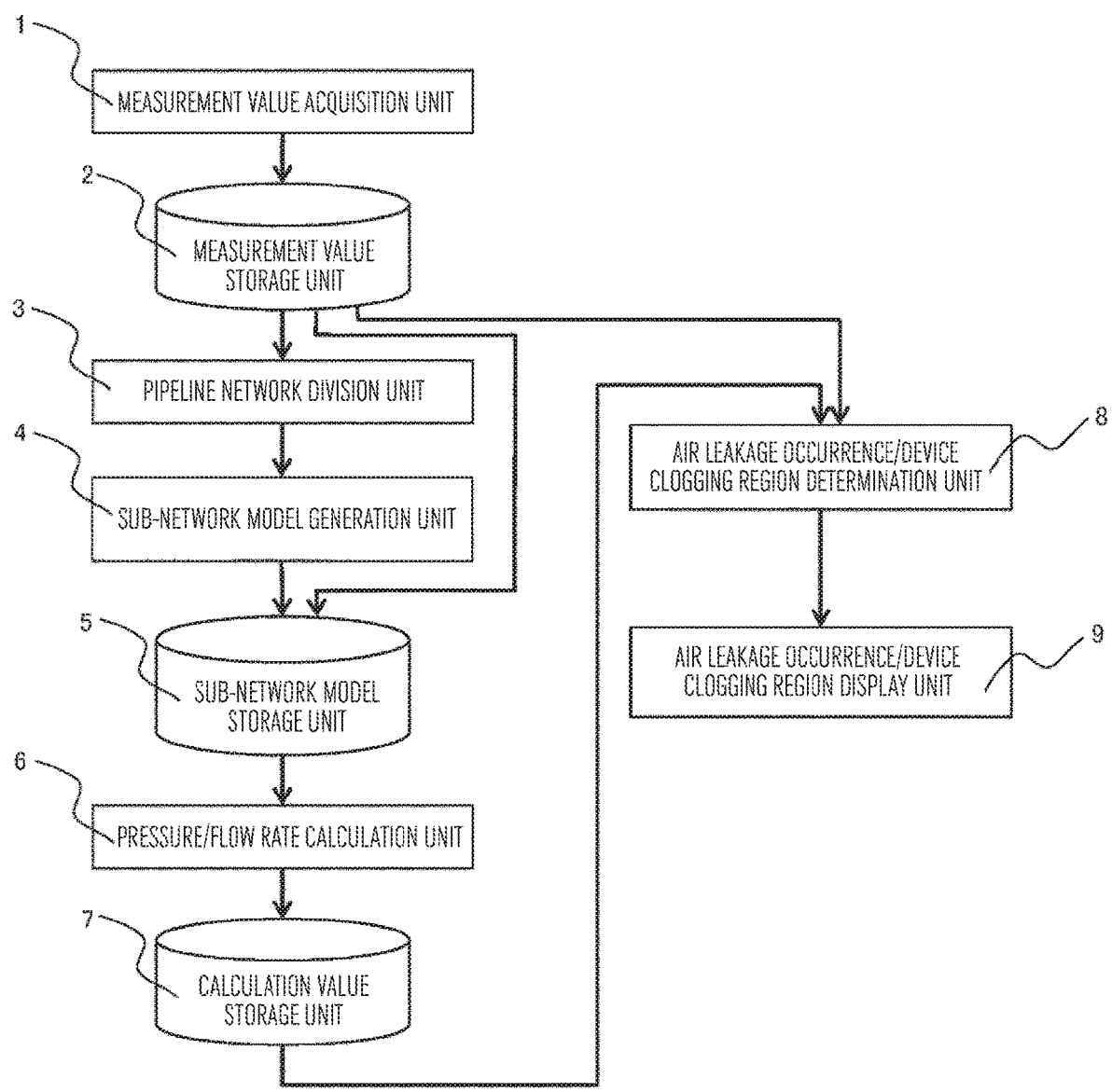
FIG. 1 is a schematic configuration diagram of a pipeline network diagnosing device according to a first embodiment of the present invention.

FIG. 1 is a schematic configuration diagram of a pipeline network diagnosing device according to a first embodiment of the present invention.

The pipeline network diagnosing device illustrated in FIG. 1 includes a measurement value acquisition unit 1, a measurement value storage unit 2, a pipeline network division unit 3, a sub-network model generation unit 4, a sub-network model storage unit 5, a pressure/flow rate calculation unit 6, a calculation value storage unit 7, an air leakage occurrence/device clogging region determination unit 8, and an air leakage occurrence/device clogging region display unit 9.

The measurement value acquisition unit 1 acquires a pressure measurement value 101 from a pressure gauge installed in a pipeline network.

The measurement value storage unit 2 includes a memory and a hard disk drive, and stores the pressure measurement value 101 acquired by the measurement value acquisition unit 1.

The pipeline network division unit 3 divides the pipeline network into sub-networks at installation positions of an air compressor, an end device, and a pressure gauge installed on a pipeline route in the pipeline network. Here, the sub-network is a partial region of the pipeline network, the pressure gauge installation position of which locates as an end portion thereof. Any region of the pipeline network necessarily belongs to one of the sub-networks.

Figure 2:
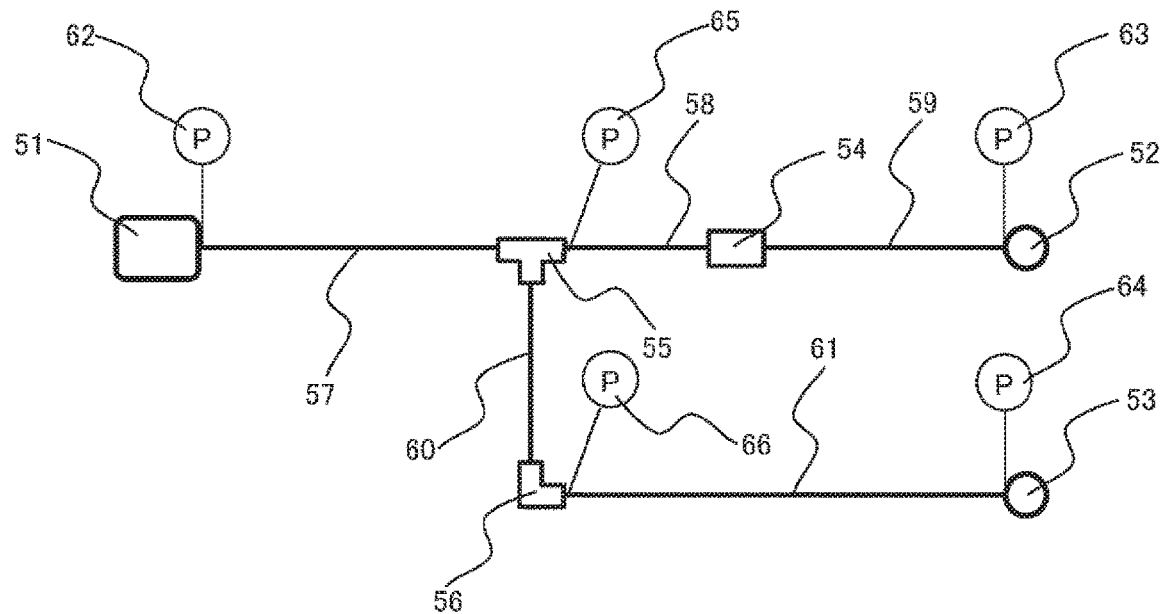
FIG. 2 is a system diagram of a pipeline network according to the first embodiment of the present invention.

A specific example of dividing the pipeline network into the sub-networks will be described with reference to FIGS. 2 and 3. FIG. 2 is a specific example of the pipeline network. The pipeline network includes an air compressor 51, end devices 52 and 53, a filter 54, a branch 55, an elbow 56, and pipelines 57 to 61. Compressed air is compressed by the air compressor 51 and is supplied to the end devices 52 and 53 via the filter 54, the branch 55, the elbow 56, and the pipelines 57 to 61. In addition, pressure gauges 62 to 66 are installed in the pipeline network.

Figure 3:
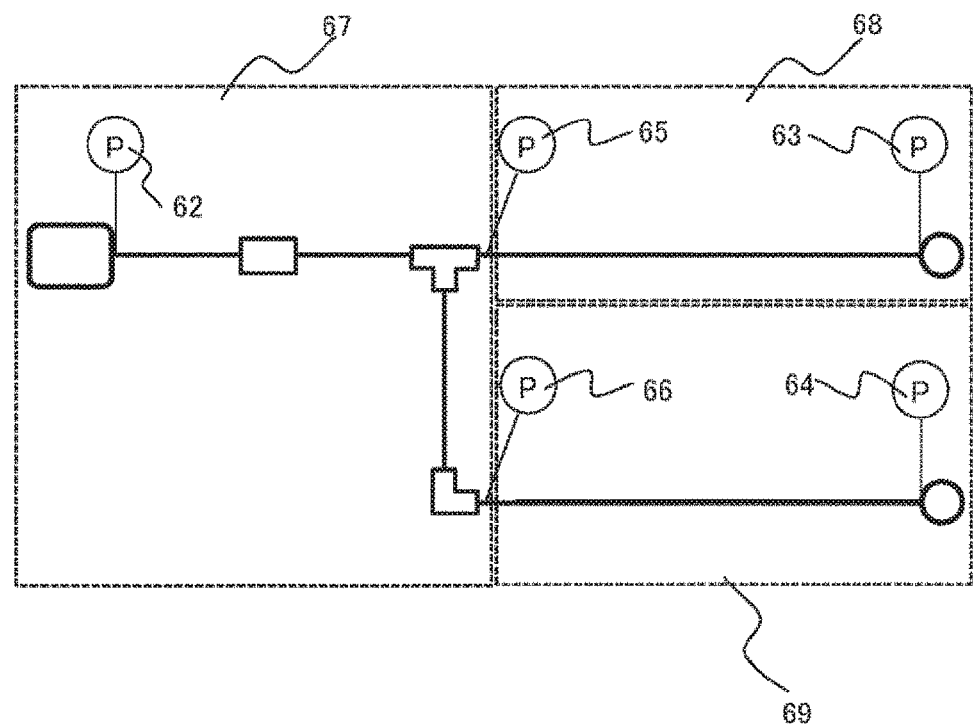
FIG. 3 is a system diagram of sub-network division according to the first embodiment of the present invention.

The pipeline network of FIG. 2 is divided into three sub-networks 67 to 69 illustrated in FIG. 3 at the installation positions of the pressure gauges 62 to 66 by the pipeline network division unit 3. The sub-network 67 is a partial region of the pipeline network, with the pressure gauges 62, 65, and 66 as ends. Similarly, the sub-network 68 is a partial region of the pipeline network, with the pressure gauges 63 and 65 as ends, and the sub-network 69 is a partial region of the pipeline network, with the pressure gauges 64 and 66 as ends.

The sub-network model generation unit 4 generates a sub-network model 102 for each sub-network output from the pipeline network division unit 3. In the sub-network model 102, data necessary for calculating the flow of air in the sub-network is set. Specifically, it is data defining the connection relationship between the devices constituting the sub-network and data defining the attributes of the device (for example, pipeline lengths, pipeline diameters, and the like for pipelines).

The sub-network model storage unit 5 includes a memory and a hard disk drive, and stores the sub-network model 102 generated by the sub-network model generation unit 4.

The pressure/flow rate calculation unit 6 calculates the flow of air in a partial region of the pipeline network from the pressure measurement value 101 and the sub-network model 102, and outputs a pressure calculation value 103 at a pressure measurement point. The partial regions to be calculated by the pressure/flow rate calculation unit 6 are two sub-networks sharing the pressure gauge installed in the middle of the pipeline route in the pipeline network, and the flow of air is calculated by using the pressure measurement value 101 at the end of the partial region as a calculation condition (boundary condition). Hereinafter, the partial region is referred to as a shared sub-network, and the pressure measurement point shared by two sub-networks in the partial region is referred to as a shared pressure measurement point.

FIGS. 4(a) to 4(c) illustrate the relationship between the shared sub-networks to be calculated, the sub-networks constituting the shared sub-networks, the pressure measurement points used as the calculation conditions, and the shared pressure measurement points with respect to the pipeline network and the sub-networks illustrated in FIGS. 2 and 3. As illustrated in FIGS. 4(a) and 4(c), the shared sub-network 70 includes the sub-network 67 and the sub-network 68, and the pressure measurement values 101 of the pressure gauges 62, 63, and 66 are used as calculation conditions. In addition, the pressure gauge 65 serves as a shared pressure measurement point. Similarly, as illustrated in FIGS. 4(b) and 4(c), the shared sub-network 71 includes the sub-network 67 and the sub-network 69, the pressure measurement values 101 of the pressure gauges 62, 64, and 65 are used as calculation conditions, and the pressure gauge 66 serves as the shared pressure measurement point.

The calculation value storage unit 7 includes a memory and a hard disk drive, and stores the pressure calculation value 103 output by the pressure/flow rate calculation unit 6.

The air leakage occurrence/device clogging region determination unit 8 compares the pressure measurement value 101 at the shared pressure measurement point with the pressure calculation value 103, determines a presence or absence of air leakage occurrence and device clogging for each sub-network, and outputs a determination result 104. Details of the determination of the presence or absence of the air leakage occurrence and the device clogging will be described below with reference to FIGS. 7 to 11.

For each sub-network, one of "the presence of the air leakage occurrence", "the presence of the device clogging", and "the absence of the air leakage occurrence/device clogging" is set to the determination result 104. The determination result 104 has, for example, the following data structure.

sub-network 1: presence of device leakage occurrence
sub-network 2: presence of device clogging
sub-network n: absence of air leakage occurrence/device clogging The air leakage occurrence/device clogging region display unit 9 includes a display device (display), and displays, on the display device, the sub-network in which the air leakage and the device clogging are determined as having occurred, by using the determination result 104 output by the air leakage occurrence/device clogging region determination unit 8.

Figure 5:
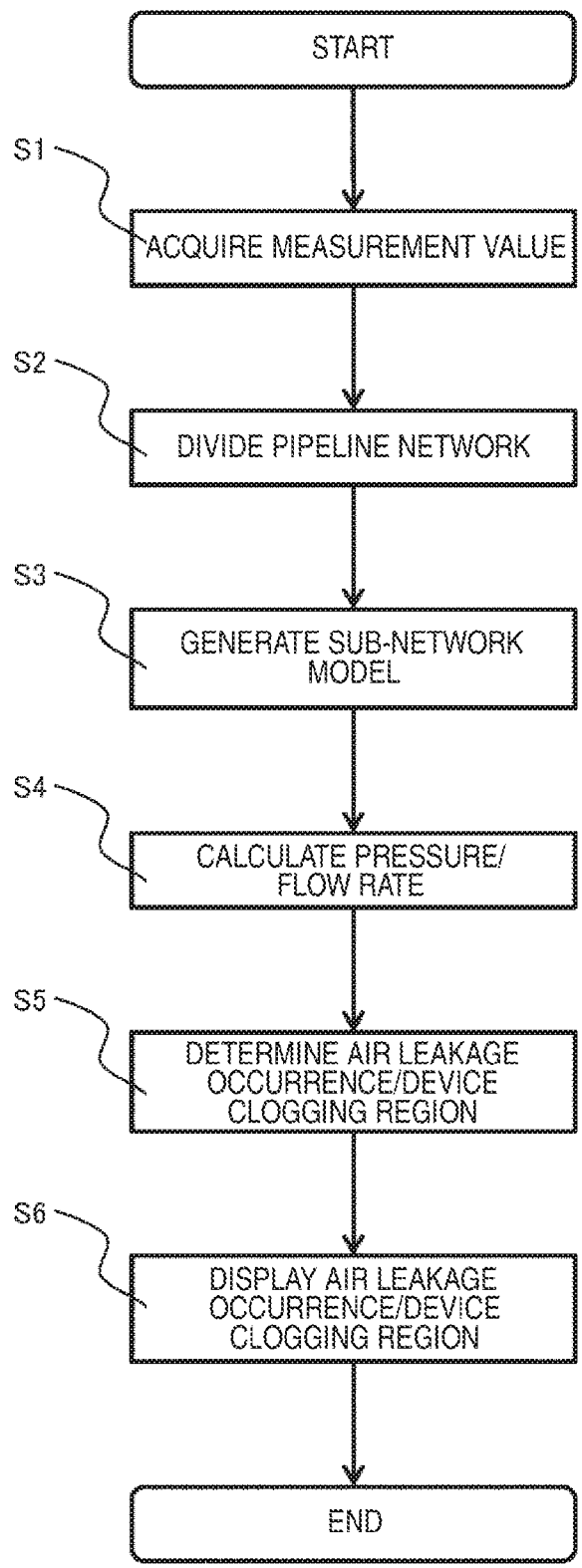
FIG. 5 is a processing procedure flow of pipeline network diagnosis according to the first embodiment of the present invention.

The configuration of the pipeline network diagnosing device has been described. Next, the processing in the pipeline network diagnosing device will be described in detail. FIG. 5 illustrates a processing procedure of pipeline network diagnosis according to the first embodiment of the present invention.

As step S1 (measurement value acquisition process), the measurement value acquisition unit 1 acquires the pressure measurement value 101 from the pressure gauge installed in the pipeline network. The pressure measurement value 101 is stored in the memory or the hard disk drive by the measurement value storage unit 2.

As step S2 (pipeline network division process), the pipeline network division unit 3 divides the pipeline network into sub-networks at the installation positions of the air compressor, the end device, and the pressure gauge installed on the pipeline route in the pipeline network.

As step S3 (sub-network model generation process), the sub-network model generation unit 4 generates the sub-network model 102 for each sub-network output from the pipeline network division unit 3 in step S2. The sub-network model 102 is stored in the memory or the hard disk drive by the sub-network model storage unit 5.

As step S4 (pressure/flow rate calculation process), the pressure/flow rate calculation unit 6 calculates the flow of air in the shared sub-network from the pressure measurement value 101 and the sub-network model 102, and outputs the pressure calculation value 103 at the pressure measurement point. The pressure calculation value 103 is stored in the memory or the hard disk drive by the calculation value storage unit 7.

As step S5 (air leakage occurrence/device clogging region determination process), the air leakage occurrence/device clogging region determination unit 8 compares the pressure measurement value 101 at the shared pressure measurement point with the pressure calculation value 103, determines the presence or absence of air leakage occurrence and device clogging for each sub-network, and outputs the determination result 104. Details of the processing of step S5 will be described below with reference to FIG. 7.

Figure 6:
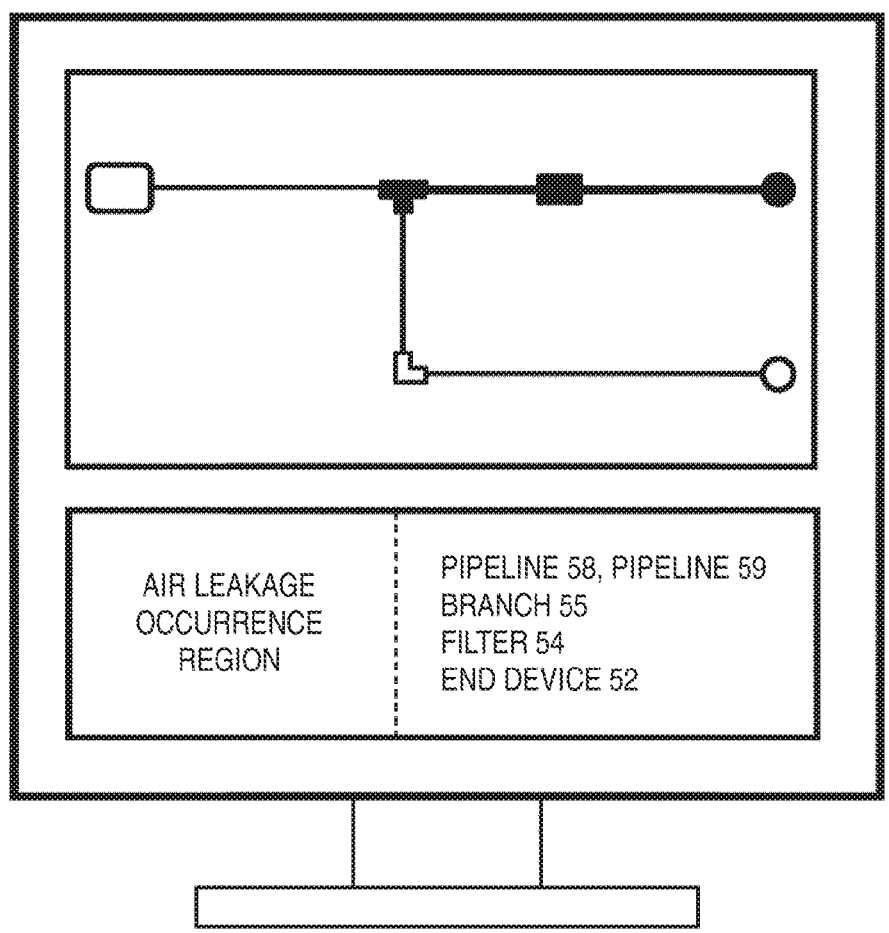
FIG. 6 is a display diagram of a display device for a sub-network in which air leakage and device clogging are determined as having occurred, according to the first embodiment of the present invention.

In step S6 (air leakage occurrence/device clogging region display process), the air leakage occurrence/device clogging region display unit 9 displays, on the display device, the sub-network in which the occurrence of the air leakage and the presence of the device clogging are determined, by using the determination result 104. FIG. 6 illustrates a display example of a case where the occurrence of the air leakage in the sub-network 68 in FIG. 3 is determined with respect to the pipeline network illustrated in FIG. 2. On the upper side of the display screen, the sub-network models for the sub-networks 67 to 69 are displayed, and the sub-network 68 determined as the presence of the air leakage occurrence among them is highlighted. On the lower side of the display screen, the air pipelines and the devices constituting the sub-network 68 are displayed as the air leakage occurrence region. In addition to the display example illustrated in FIG. 6, only the upper side of the display screen in FIG. 6 or only the lower side of the display screen may be displayed.

Next, details of the processing of step S5 (air leakage occurrence/device clogging region determination process) will be described with reference to FIG. 7. Step S5 includes seven processing steps from step S51 to step S57.

As step S51 (determination target sub-network setting process), the sub-network for determining air leakage occurrence and device clogging is set. Hereinafter, this sub-network is referred to as a determination target sub-network.

As step S52 (air leakage occurrence determination process), the air leakage occurrence/device clogging region determination unit 8 subtracts the pressure calculation value 103 from the pressure measurement value 101 for all the shared pressure measurement points included in the determination target sub-network, and determines whether or not the subtraction value is greater than a threshold value 105. If the determination result is Yes, the processing proceeds to step S53 (air leakage presence setting process), and if No, the processing proceeds to step S54 (device clogging determination process). The threshold value 105 is set to a value of about several times the measurement accuracy based on the measurement accuracy of the pressure gauge.

As step S53 (air leakage presence setting process), the attribute value of the determination result 104 for the determination target sub-network is set to "presence of air leakage".

As step S54 (device clogging determination process), the air leakage occurrence/device clogging region determination unit 8 subtracts the pressure measurement value 101 from the pressure calculation value 103 for all the shared pressure measurement points included in the determination target sub-network, and determines whether or not the subtraction value is greater than a threshold value 105. If the determination result is Yes, the processing proceeds to step S55 (device clogging presence setting process), and if No, the processing proceeds to step S56 (air leakage occurrence/device clogging absence setting process).

As step S55 (device clogging presence setting process), the attribute value of the determination result 104 for the determination target sub-network is set to "presence of device clogging".

As step S56 (air leakage occurrence/device clogging absence setting process), the attribute value of the determination result 104 for the determination target sub-network is set to "absence of air leakage occurrence/device clogging".

As step S57 (sub-network determination completion confirmation process), the air leakage occurrence/device clogging region determination unit 8 confirms whether or not the determination of the air leakage occurrence/device clogging has been completed for all the sub-networks included in the pipeline network. If the confirmation result is No, the processing returns to step S51, and if Yes, the processing proceeds to step S6 (air leakage occurrence/device clogging region display process) illustrated in FIG. 5.

The details of the processing of step S5 has been described. Next, a specific example of the processing steps S51 to S57 in a case where air leakage occurs will be described with reference to FIGS. 8 and 9. For the pipeline network illustrated in FIG. 2, as illustrated in FIG. 8(*a*), a case where air leakage occurs in a portion 72 inside the pipeline 59 is considered. FIGS. 8(*b*) and 8(*c*) are diagrams respectively illustrating a flow rate change and a pressure change until the compressor air compressed by the air compressor 51 reaches the end device 52 via the pipeline 57, the branch 55, the pipeline 58, the filter 54, and the pipeline 59. A solid line indicates the calculation value obtained by the pressure/flow rate calculation unit 6, with the shared sub-network 70 in FIG. 4 as the calculation target, and a dashed line indicates the measurement value. In addition, L1 is an outlet port of the compressor 51, L2 is an outlet port of the branch 55, L3 is the filter 54, L4 is the portion 72, and L5 is an inlet port of the end device 52.

In an actual pipeline network, air leakage occurs in the shared sub-network 70, but since the pressure/flow rate calculation unit 6 performs the calculation under the condition that air leakage does not occur, a difference occurs between the calculation value and the measurement value. In the following, the difference will be described.

Figure 8A:
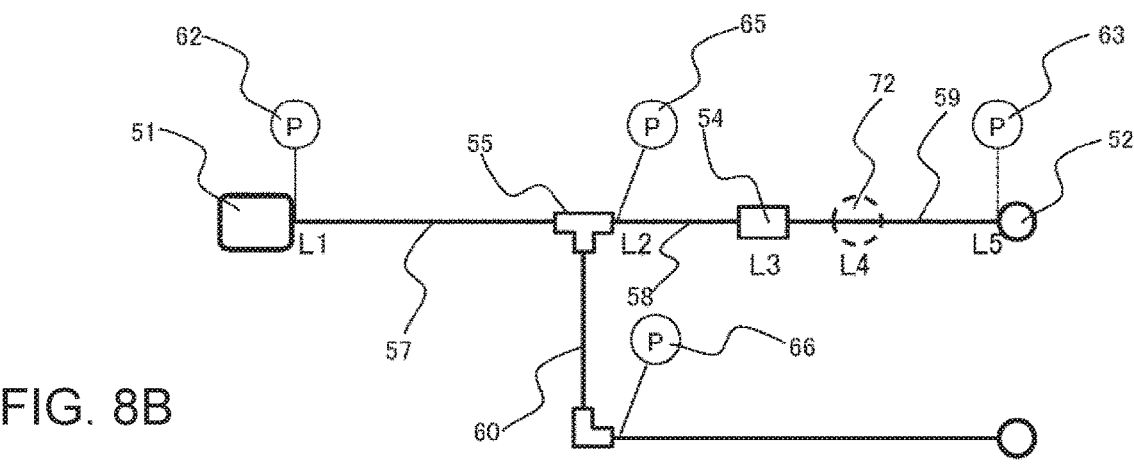
FIGS. 8A to 8C are diagrams showing a flow rate change and a pressure change in a pipeline network in a case where air leakage occurs, according to the first embodiment of the present invention.
Figure 8B:

The calculated flow rate changes as indicated by a solid line in FIG. 8(b). A flow rate at L1 to L2 is G1. Since a part of the compressed air at the branch 55 flows to the pipeline 60, a flow rate at L2 to L4 decreases from G1 to G2. Since the pressure/flow rate calculation unit 6 performs the calculation under the condition that air leakage does not occur at the portion 72, a flow rate at L4 to L5 is G 2 which is equal to a flow rate at L2 to L4. On the other hand, the flow rate measurement value changes as indicated by a dashed line in FIG. 8(b). Since air leakage occurs at the portion 72, a flow rate at L1 to L2 is G3 which is greater than G1. Since a part of the compressed air at the branch 55 flows to the pipeline 60, a flow rate at L2 to L4 decreases from G3 to G4. Further, since air leaks at the portion 72, a flow rate at L4 to L5 decreases from G4 to G5.

Figure 8C:
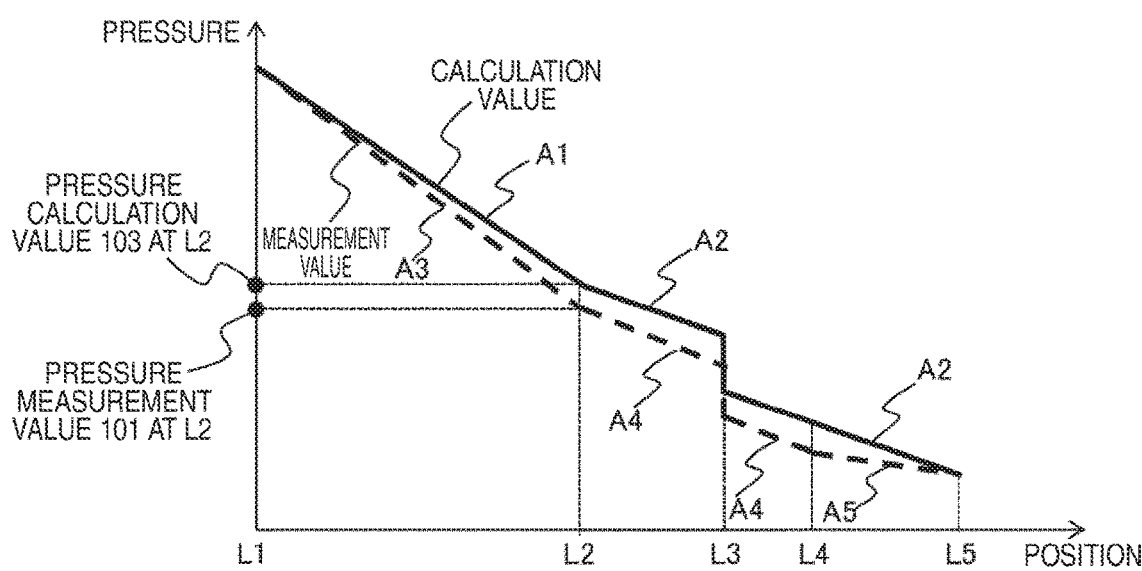

According to the characteristics that the pressure of the air flowing through the pipeline decreases at a substantially constant change rate and the change rate is proportional to the square of the flow rate, the pressure calculation value changes as indicated by a solid line in FIG. 8(c). An amount of the pressure decreases at a change rate A1 between L1 and L2, and further decreases at a change rate A2 between L2 and L5. In addition, the pressure at L3 decreases due to a pressure loss generated at the filter 54. On the other hand, the pressure measurement value changes as indicated by a dashed line in FIG. 8(c). The pressure decreases at a change rate A3 at L1 to L2, decreases at a change rate A4 at L2 to L4, and decreases at a change rate A5 at L4 to L5. In addition, the pressure at L3 decreases due to a pressure loss generated at the filter 54. Here, since there is a relationship of G3>G1>G4>G2>G5 with respect to the flow rate, a pressure change rate has a relationship of A3>A1>A4>A2>A5. As a result, at the installation point (L2) of the pressure gauge 65, the pressure calculation value 103 becomes larger than the pressure measurement value 101.

On the other hand, since there is no air leakage in the shared sub-network 71 in FIG. 4, there is no difference between the measurement value and the calculation value obtained by the pressure/flow rate calculation unit 6, with the shared sub-network 71 as the calculation target. As a result, at the installation point of the pressure gauge 66, the pressure calculation value 103 and the pressure measurement value 101 are the same with each other.

An example in which the air leakage occurrence/device clogging region is determined based on the processing steps S51 to S57 with respect to the pipeline network illustrated in FIG. 8(a) will be described with reference to FIG. 9. FIG. 9 illustrates the shared pressure measurement point included in the sub-network, the relationship between the pressure calculation value 103 and the pressure measurement value 101 at the shared pressure measurement point, and the determination result with respect to each sub-network. The sub-network 67 includes the pressure gauge 65 and the pressure gauge 66 as the shared pressure measurement points. As described above, the pressure calculation value—the pressure measurement value>the threshold value in the pressure gauge 65, the pressure calculation value —the pressure measurement value≤the threshold value in the pressure gauge 66, and the pressure measurement value—the pressure calculation value≤the threshold value. As a result, since the determination result of step S52 is No and the determination result of subsequent step S54 is also No, the attribute value of the determination result 104 for the sub-network 67 is set to "absence of air leakage occurrence/device clogging" in step S56. Next, the sub-network 68 includes the pressure gauge 65 as the shared pressure measurement point. Since the determination result of step S52 for the sub-network 68 is Yes, the attribute value of the determination result 104 for the sub-network 68 is set to "presence of air leakage occurrence" in step S53. Next, the sub-network 69 includes the pressure gauge 66 as the shared pressure measurement point. Since the determination result of step S52 for the sub-network 69 is No and the determination result of subsequent step S54 is also No, the attribute value of the determination result 104 for the sub-network 69 is set to "absence of air leakage occurrence/device clogging" in step S56.

A specific example of the processing steps S51 to S57 in a case where air leakage occurs has been described. Next, a specific example of the processing steps S51 to S57 in a case where there is device clogging will be described with reference to FIGS. 10 and 11. A case where the filter 54 is clogged in the pipeline network illustrated in FIG. 2 is considered. FIGS. 10(a) and 10(b) are diagrams respectively illustrating a flow rate change and a pressure change until the compressor air compressed by the air compressor 51 reaches the end device 52 via the pipeline 57, the branch 55, the pipeline 58, the filter 54, and the pipeline 59. A solid line indicates the calculation value obtained by the pressure/flow rate calculation unit 6, with the shared sub-network 70 in FIG. 4 as the calculation target, and a dashed line indicates the measurement value.

In an actual pipeline network, the filter 54 is clogged in the shared sub-network 70, but since the pressure/flow rate calculation unit 6 performs calculation under the condition without clogging, a difference occurs between the calculation value and the measurement value. In the following, this difference will be described.

The calculated flow rate changes as indicated by a solid line in FIG. 10(a). A flow rate at L1 to L2 is G1. Since a part of the compressed air at the branch 55 flows to the pipeline 60, a flow rate at L2 to L5 decreases from G1 to G2. On the other hand, the flow rate measurement value changes as indicated by a dashed line in FIG. 10(a). Since the pressure loss at the filter 54 increases due to the clogging of the filter 54, a flow rate at L1 to L2 is G3, which is less than G1. Since a part of the compressed air at the branch 55 flows to the pipeline 60, a flow rate at L2 to L5 decreases from G3 to G4.

The pressure calculation value changes as indicated by a solid line in FIG. 10(b). The pressure decreases at a change rate A1 at L1 to L2 and decreases at a change rate A2 at L2 to L5. In addition, the pressure at L3 decreases due to a pressure loss generated at the filter 54. On the other hand, the pressure measurement value changes as indicated by a dashed line in FIG. 10(b). The pressure decreases at a change rate A3 at L1 to L2 and decreases at a change rate A4 at L2 to L5. In addition, the pressure at L3 decreases due to a pressure loss generated at the filter 54. An amount of decrease of pressure at the filter 54 is greater at the measurement value than at the calculation value. Here, since there is a relationship of G1>G3>G2>G4 with respect to the flow rate, a pressure change rate has a relationship of A1>A3>A2>A4. As a result, at the installation point (L2) of the pressure gauge 65, the pressure calculation value 103 takes a value less than the pressure measurement value 101.

On the other hand, since there is no device clogging in the shared sub-network 71 in FIG. 4, there is no difference between the measurement value and the calculation value obtained by the pressure/flow rate calculation unit 6, with the shared sub-network 71 as the calculation target. As a result, at the installation point of the pressure gauge 66, the pressure calculation value 103 and the pressure measurement value 101 take the same value.

In a case where the filter 54 is clogged in the pipeline network illustrated in FIG. 2, an example of determining air leakage occurrence/device clogging region based on the processing steps S51 to S57 is described with reference to FIG. 11. FIG. 11 illustrates the shared pressure measurement point included in the sub-network, the relationship between the pressure measurement value 101 and the pressure calculation value 103 at the shared pressure measurement point, and the determination result with respect to each sub-network. The sub-network 67 includes the pressure gauge 65 and the pressure gauge 66 as the shared pressure measurement points. As described above, the pressure measurement value—the pressure calculation value>the threshold value in the pressure gauge 65, the pressure calculation value—the pressure measurement value≤the threshold value in the pressure gauge 66, and the pressure measurement value—the pressure calculation value≤the threshold value. As a result, since the determination result of step S52 is No and the determination result of subsequent step S54 is also No, the attribute value of the determination result 104 for the sub-network 67 in step S56 is set to "absence of air leakage occurrence/device clogging". Next, the sub-network 68 includes the pressure gauge 65 as the shared pressure measurement point. Since the determination result of step S52 for the sub-network 68 is No and the determination result of subsequent step S54 is Yes, the attribute value of the determination result 104 for the sub-network 68 is set to "presence of device clogging" in step S55. Next, the sub-network 69 includes the pressure gauge 66 as the shared pressure measurement point. Since the determination result of step S52 for the sub-network 69 is No and the determination result of subsequent step S54 is also No, the attribute value of the determination result 104 for the sub-network 69 is set to "absence of air leakage occurrence/device clogging" in step S56.

A specific example of the processing steps S51 to S57 in a case where there is device clogging has been described.

In the present embodiment, according to the processing procedure of the pipeline network diagnosis illustrated in FIG. 5, the air leakage occurrence/device clogging region in the pipeline network is determined. It is unnecessary for a user to input the air leakage position candidate, and it is unnecessary to grasp a state of aged deterioration of a target pipeline network facility, a place where a gap can occur, or the like in advance.

Figure 7:
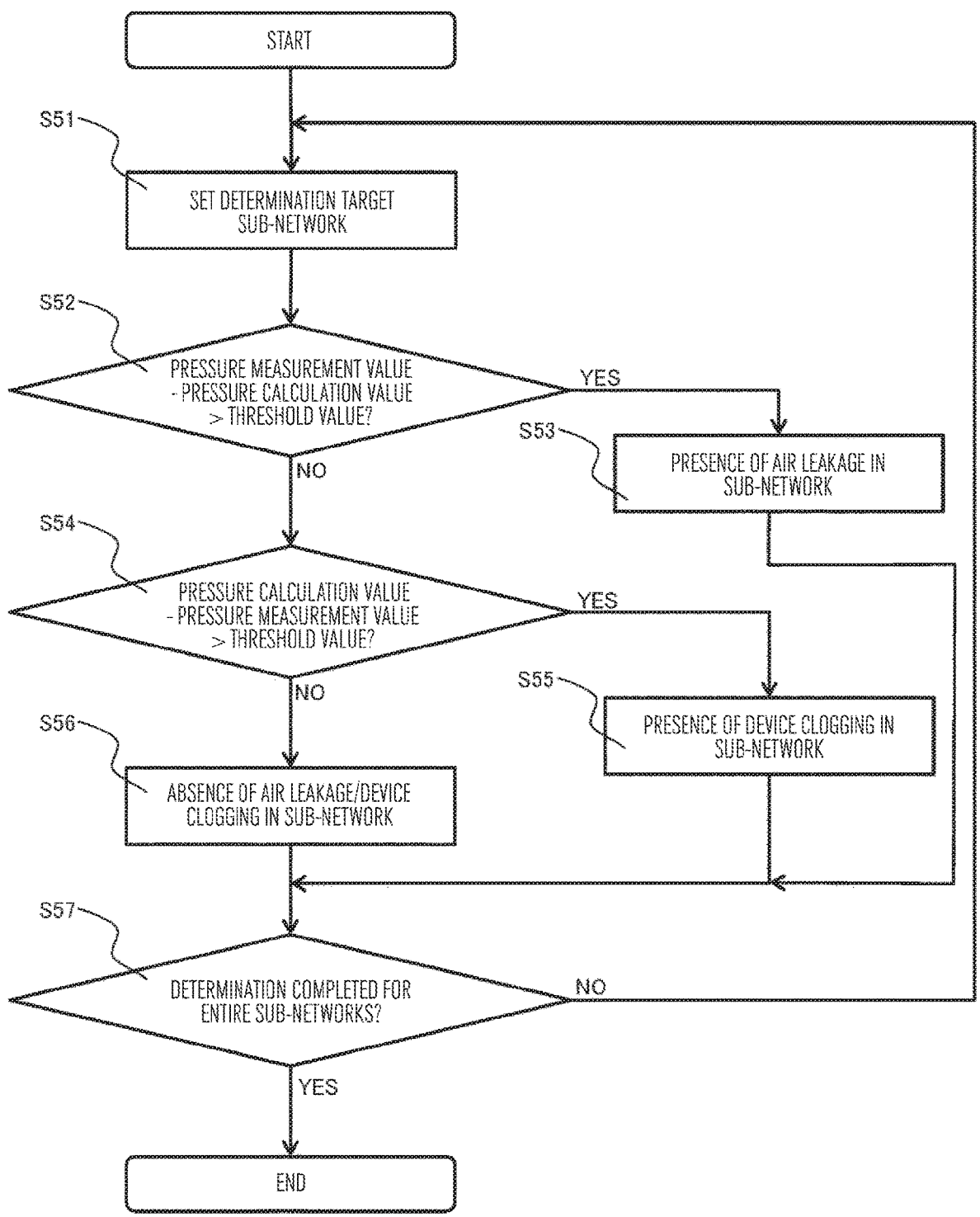
FIG. 7 is a detailed flow of processing of determining air leakage occurrence and device clogging regions, according to the first embodiment of the present invention.

In addition, in the present embodiment, according to the air leakage occurrence/device clogging region determination processing procedure illustrated in FIG. 7, the air leakage occurrence/device clogging region is determined by comparing the pressure measurement value with the pressure calculation value at the shared pressure measurement point. Since it is unnecessary to solve the optimization problem based on the convergence calculation, it is possible to determine the air leakage occurrence/device clogging region in a short calculation time even in the case of a large-scale pipeline network.

Furthermore, the technique disclosed in Patent Literature 1 has a problem that cannot grasp the state of device clogging. However, in the present embodiment, the device clogging region can be determined.

As described above, according to the present embodiment, a user's input of air leakage position candidates is not required and it is possible to grasp air leakage positions and device clogging states inside the pipeline network in a short calculation time even with respect to a large-scale pipeline network.

Embodiment 2

Figure 12:
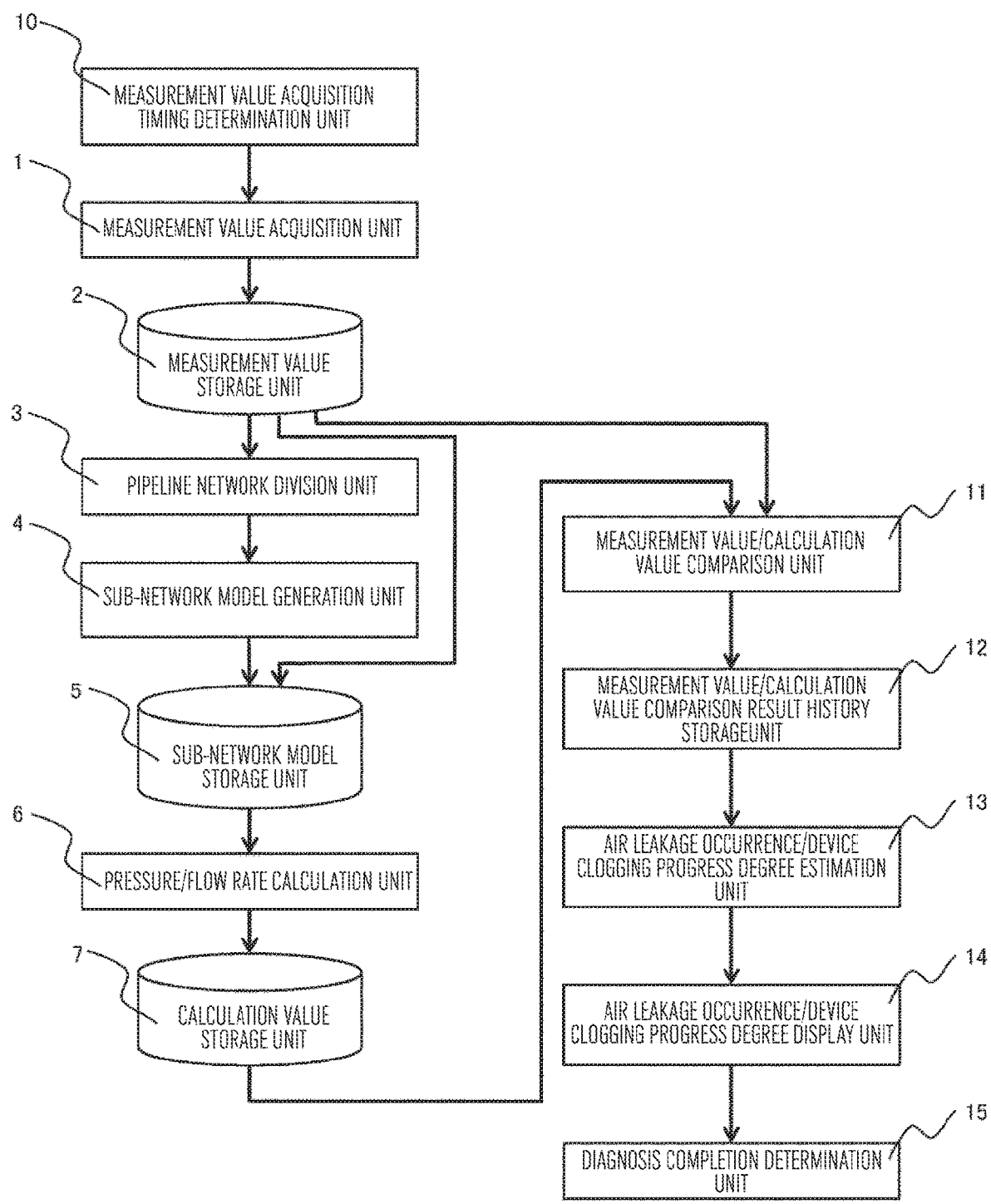
FIG. 12 is a schematic configuration diagram of a pipeline network diagnosing device according to a second embodiment of the present invention.

FIG. 12 is a schematic configuration diagram of a pipeline network diagnosing device according to a second embodiment of the present invention. The same parts as those in the first embodiment are denoted by the same reference numerals as those in the previous drawings in the same drawings, and descriptions thereof will be omitted.

The present embodiment differs from the first embodiment in that the history of the comparison result between the pressure measurement value 101 and the pressure calculation value 103 at the shared pressure measurement point is stored, and, with taking the stored history into consideration, the progress status of aged deterioration of air pipeline and device can be grasped by estimating the progress status of air leakage occurrence/device clogging in the pipeline network with the passage of time. Specifically, the pipeline network diagnosing device according to the present embodiment includes, instead of the air leakage occurrence/device clogging region determination unit 8 and the air leakage occurrence/device clogging region display unit 9, an measurement value acquisition timing determination unit 10, a measurement value/calculation value comparison unit 11, a measurement value/calculation value comparison result history storage unit 12, an air leakage occurrence/device clogging progress degree estimation unit 13, an air leakage occurrence/device clogging progress degree display unit 14, and a diagnosis completion determination unit 15.

The measurement value acquisition timing determination unit 10 determines whether or not a current time is matched with a preset measurement value acquisition timing, and when matched, issues a measurement value acquisition command to the measurement value acquisition unit 1. With respect to the measurement value acquisition timing, a time interval required for determining the progress degree of air leakage occurrence/device clogging is set. For example, values such as "obtain measurement value at 11 a.m. and 3 p.m. every day" are set with respect to a time zone during which the air compressor operates.

For each sub-network, the measurement value/calculation value comparison unit 11 calculates a subtraction result 107 of subtracting the pressure calculation value 103 from the pressure measurement value 101 and a subtraction result 108 of subtracting the pressure measurement value 101 from the pressure calculation value 103 with respect to the shared pressure measurement point included in the sub-network, and outputs the subtraction results 107 and 108. Assuming that the pressure measurement value 101 is PM and the pressure calculation value 103 is PA, the subtraction result 107 ΔP1 and the subtraction result 108 ΔP2 are calculated from the following formulae.

$$\Delta P1 = \text{Max}(PM-PA, 0) \quad (1)$$

$$\Delta P2 = \text{Max}(PA-PM, 0) \quad (2)$$

The measurement value/calculation value comparison result history storage unit 12 includes a memory and a hard disk drive, and the comparison result history 105 is stored based on the subtraction result 107 and the subtraction result 108 output by the measurement value/calculation value comparison unit 11. The comparison result history 105 has a data structure as illustrated in, for example, FIG. 13 and is configured in association with the sub-network, the shared pressure measurement point, the measurement time, and the subtraction result.

The shared pressure measurement point is data indicating the shared pressure measurement point included in the sub-network.

The measurement time is data indicating the time when the pressure measurement value 101 was acquired.

The subtraction result is data indicating the subtraction result 107 and the subtraction result 108 at the measurement time.

The air leakage occurrence/device clogging progress degree estimation unit 13 estimates the progress degree of air leakage occurrence and device clogging with respect to each sub-network, based on the comparison result history 105, and outputs the progress degree estimation result 106. Assuming that the number of the shared pressure measurement points included in the sub-network is N, the subtraction result 107 for an $i^{th}$ shared pressure measurement point is $\Delta P1$-$i$, and the allowable air leakage occurrence value is EP1, the progress degree of the air leakage occurrence W1 is calculated by the following formula.

$$W1=\text{Max}(\Delta P1\text{-}1, \Delta P1\_2, \ldots, \Delta P1\_N)/EP1 \times 100 \quad (3)$$

Here, the allowable air leakage occurrence value EP1 is a value in units of pressure, which is determined according to the timing of repairing and replacing the air pipeline due to aged deterioration. When EP1 is set to be small, the timing of repairing and replacing the air pipeline becomes earlier, and when EP1 is set to be large, the timing is delayed.

Similarly, assuming that the subtraction result 108 for the shared pressure measurement point is $\Delta P2$-$i$ and the allowable device clogging value is EP2, the progress degree W2 of device clogging is calculated by the following formula.

$$W2=\text{Max}(\Delta P2\text{-}1, \Delta P2\_2, \ldots, \Delta P2\_N)/EP2 \times 100 \quad (4)$$

Here, the allowable device clogging value EP2 is a value in units of pressure, which is determined according to the timing of repairing and replacing the device due to aged deterioration. When EP2 is set to be small, the timing of repairing and replacing the device becomes earlier, and when EP2 is set to be large, the timing is delayed.

For each sub-network, the progress degree of air leakage occurrence and device clogging is set to the progress degree estimation result 106. The progress degree estimation result 106 has, for example, the following data structure.

sub-network 1
measurement time=XX1, progress degree of air leakage occurrence=0%, progress degree of device clogging=1%
measurement time=XX2, progress degree of air leakage occurrence=0%, progress degree of device clogging=1%
measurement time=XXm, progress degree of air leakage occurrence=6%, progress degree of device clogging=38%
sub-network 2
measurement time=XX1, progress degree of air leakage occurrence=0%, progress degree of device clogging=0%
measurement time=XX2, progress degree of air leakage occurrence=0%, progress degree of device clogging=0%
measurement time=XXm, progress degree of air leakage occurrence=2%, progress degree of device clogging=5%
sub-network n
measurement time=XX1, progress degree of air leakage occurrence=0%, progress degree of device clogging=2%
measurement time=XX2, progress degree of air leakage occurrence=1%, progress degree of device clogging=3%
measurement time=XXm, progress degree of air leakage occurrence=12%, progress degree of device clogging=45%

The air leakage occurrence/device clogging progress degree display unit 14 includes a display device (display), and displays, on the display device, the progress degree of air leakage occurrence and device clogging with respect to each sub-network by using the progress degree estimation result 106 output by the air leakage occurrence/device clogging progress degree estimation unit 13.

The diagnosis completion determination unit 15 includes an input device (keyboard, mouse, or the like), and completes the pipeline network diagnosis processing when a diagnosis completion command is input from the input device.

Figure 14:
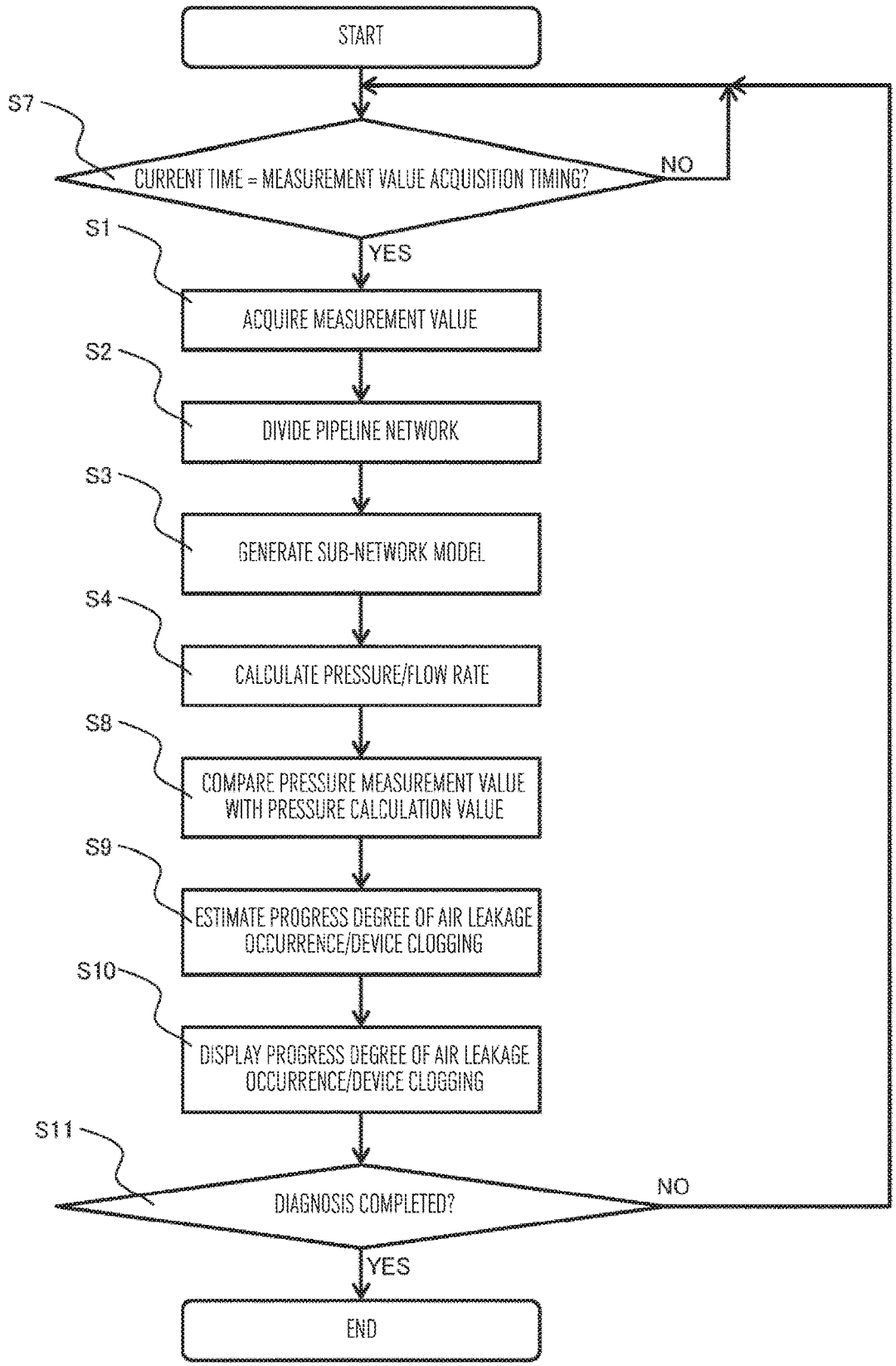
FIG. 14 is a processing procedure flow of pipeline network diagnosis according to the second embodiment of the present invention.

The above point is the difference of the present embodiment from the first embodiment, and the other points are the same as the first embodiment. Next, the processing in the pipeline network diagnosing device will be described in detail. FIG. 14 illustrates a processing procedure of pipeline network diagnosis according to a second embodiment of the present invention. The same parts as those in the first embodiment are denoted by the same reference numerals in FIG. 14 as those in the previously-discussed drawings, and descriptions thereof will be thus omitted.

The processing procedure of the present embodiment differs from the processing procedure of the first embodiment in that processing steps S7 to S11 are included instead of the steps S5 and S6.

As step S7 (measurement value acquisition timing determination process), the measurement value acquisition timing determination unit 10 determines whether or not a current time is matched with a preset measurement value acquisition timing. If the determination result is Yes, the processing proceeds to step S1 (measurement value acquisition process), and if No, the processing of step S7 is continued.

As step S8 (measurement value/calculation value comparison process), for each sub-network, the measurement value/calculation value comparison unit 11 subtracts the pressure calculation value 103 from the pressure measurement value 101 and subtracts the pressure measurement value 101 from the pressure calculation value 103 with respect to the shared pressure measurement point included in the sub-network, and outputs subtraction results 107 and 108. The subtraction results 107 and 108 are stored in the memory or the hard disk drive as the comparison result history 105 by the measurement value/calculation value comparison result history storage unit 12.

As step S9 (air leakage occurrence/device clogging progress degree estimation process), the air leakage occurrence/device clogging progress degree estimation unit 13 determines the progress degree of air leakage occurrence and device clogging for each sub-network, based on the comparison result history 105, and outputs the progress degree estimation result 106.

Figure 15:
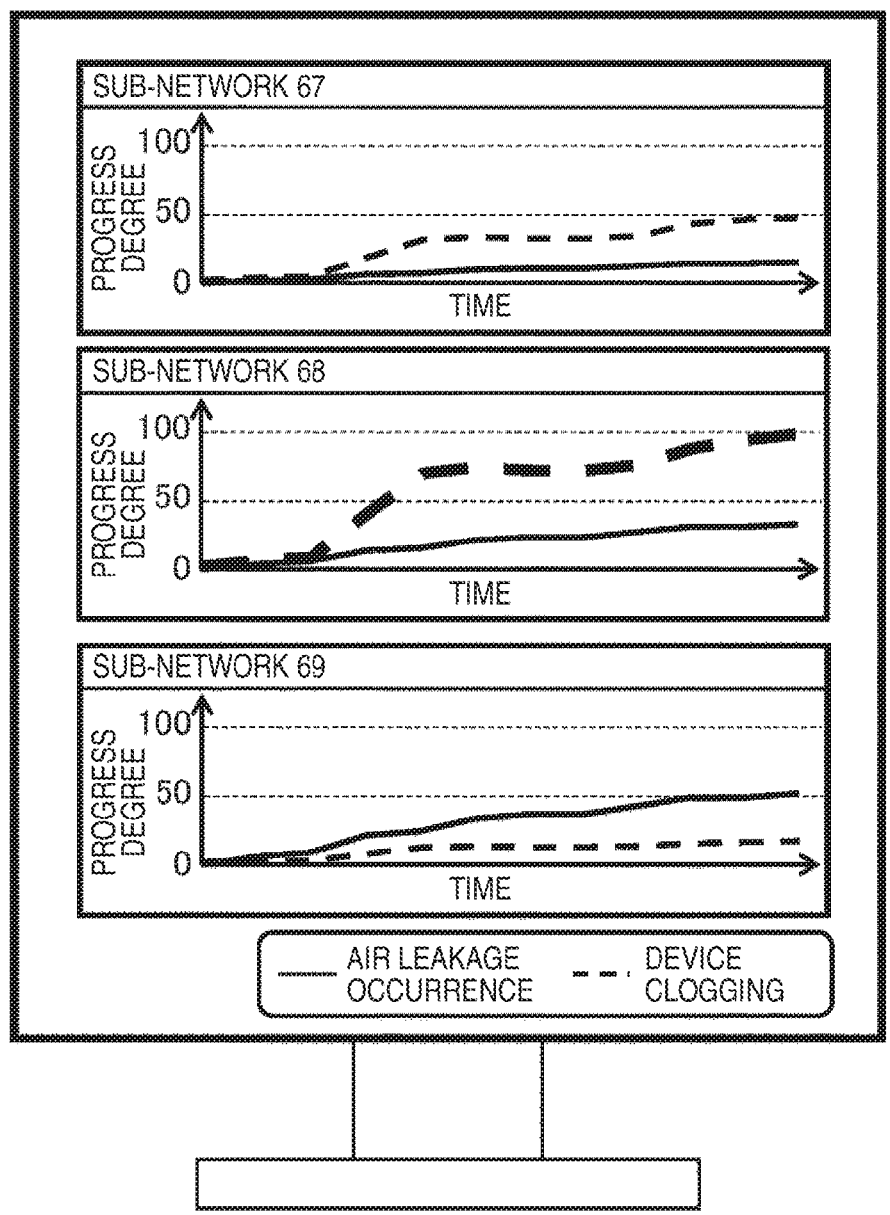
FIG. 15 is a display diagram illustrating the progress degree of air leakage occurrence and device clogging, according to the second embodiment of the present invention.

As step S10 (air leakage occurrence/device clogging progress degree display process), the air leakage occurrence/device clogging progress degree display unit 14 displays, on the display device, the progress degree of occurrence/device clogging with respect to each sub-network by using the progress degree estimation result 106. FIG. 15 illustrates an example in which the progress degrees of air leakage occurrence and device clogging are displayed for each of the sub-networks 67 to 69 in FIG. 3 with respect to the pipeline network illustrated in FIG. 2. For each sub-network, the time transition of the progress degree of air leakage occurrence (solid line) and the progress degree of device clogging (dashed line) are graphically displayed. When the progress degree has reached 100%, the graph is highlighted. It is thus possible for the user to repair or exchange the air pipeline and device constituting the sub-network, of which the progress degree has reached 100%, alternatively to diagnose the progress status of aged deterioration with respect to only the air pipeline and device by using an existing technology (for example, a nondestructive inspection apparatus such as an ultrasonic thickness gauge).

As step S11 (diagnosis completion determination process), the diagnosis completion determination unit 15 determines whether or not a diagnosis completion command has been input from the input device. If the determination result is No, the processing proceeds to step S7 (measurement value acquisition timing determination process), and if Yes, the processing ends.

The above point is the difference of the processing procedure of the present embodiment from the first embodiment, and the other points are the same as the processing procedure of the first embodiment.

As described above, in the present embodiment, in addition to each effect obtained in the first embodiment, it is possible to grasp the progress status of aged deterioration of the air pipeline and device and determine the timing of repairing or replacing the air pipeline and device by estimating the progress status of air leakage occurrence and device clogging in the pipeline network with the passage of time.

In the above embodiment of the present invention, the mode in which the fluid flowing through the pipeline network is the compressed air compressed by the air compressor has been described, but the present invention is not limited thereto. Steam, water, air for air conditioning, oil for hydraulic pressure, or the like may flow through the pipeline network.

REFERENCE SIGNS LIST 1 measurement value acquisition unit
2 measurement value storage unit
3 pipeline network division unit
4 sub-network model generation unit
5 sub-network model storage unit
6 pressure/flow rate calculation unit
7 calculation value storage unit
8 air leakage occurrence/device clogging region determination unit
9 air leakage occurrence/device clogging region display uni0
10 measurement value acquisition timing determination uni0
11 measurement value/calculation value comparison unit
12 measurement value/calculation value comparison result history storage unit
13 air leakage occurrence/device clogging progress degree estimation unit
14 air leakage occurrence/device clogging progress degree display unit
15 diagnosis completion determination unit
51 air compressor
52, 53 end device
54 filter
55 branch
56 elbow
57-61 pipeline
62-66 pressure gauge
67-69 sub-network
70, 71 shared sub-network
101 pressure measurement value
102 sub-network model
103 pressure calculation value
104 determination result
105 comparison result history
106 progress degree estimation result
107 subtraction result of subtracting pressure calculation value from pressure measurement value
108 subtraction result of subtracting pressure measurement value from pressure calculation value

The invention claimed is:

1. A pipeline network diagnosing device comprising:
a measurement value acquisition unit configured to acquire a pressure measurement value from a pressure gauge installed in a pipeline network;
a measurement value storage unit configured to store the pressure measurement value;
a pipeline network division unit configured to divide the pipeline network into sub-networks, which are partial regions of the pipeline network, at installation positions of a fluid supply device, a fluid consumption device, and the pressure gauge installed on a pipeline route in the pipeline network with respect to the pipeline network;
a sub-network model generation unit configured to generate a sub-network model comprising data for calculating a flow of fluid in the sub-network for each of the sub-networks;
a sub-network model storage unit configured to store the sub-network model;
a pressure/flow rate calculation unit configured to calculate a flow of fluid from the pressure measurement value and the sub-network model in a shared sub-network by using the pressure measurement value as a calculation condition at an end of the shared sub-network with respect to the shared sub-network which is a partial region comprising two sub-networks sharing the pressure gauge installed in the pipeline route in the pipeline network, and output a pressure calculation value at a pressure measurement point;
a calculation value storage unit configured to store the pressure calculation value;
a fluid leakage occurrence/device clogging region determination unit configured to compare the pressure measurement value at a shared pressure measurement point with the pressure calculation value with respect to the shared pressure measurement point shared by the two sub-networks in the shared sub-network, determine a presence or absence of fluid leakage occurrence and device clogging with respect to each of the sub-networks, and output a determination result; and
a fluid leakage occurrence/device clogging region display unit comprising a display device and configured to display, on the display device, the sub-network in which fluid leakage and device clogging are determined as having occurred, by using the determination result;
wherein the pressure gauge includes a plurality of pressure gauges, and each of the sub-networks includes at least one of the plurality of pressure gauges which is different from pressure gauges arranged in other sub-networks.

2. The pipeline network diagnosing device according to claim 1, wherein the process in which the fluid leakage occurrence/device clogging region determination unit determines the presence or absence of the fluid leakage occurrence and the device clogging with respect to each of the sub-networks comprises the steps of:
determining the presence of the fluid leakage occurrence in the sub-network when a subtraction value obtained by subtracting the pressure calculation value from the pressure measurement value with respect to the entire shared pressure measurement points included in the sub-network is greater than a threshold value;

determining the presence of the device clogging in the sub-network when a subtraction value obtained by subtracting the pressure measurement value from the pressure calculation value is greater than a threshold value, with respect to the entire shared pressure measurement points included in the sub-network; and determining the absence of the fluid leakage occurrence/device clogging in the sub-network when the subtraction value obtained by subtracting the pressure calculation value from the pressure measurement value is less than or equal to a threshold value and the subtraction value obtained by subtracting the pressure measurement value from the pressure calculation value is less than or equal to a threshold value, with respect to one of the shared pressure measurement points included in the sub-network.

3. A pipeline network diagnosing device comprising:

a measurement value acquisition unit configured to acquire a pressure measurement value from a pressure gauge installed in a pipeline network;

a measurement value acquisition timing determination unit configured to determine whether or not a current time is matched with a measurement value acquisition timing, and when matched, issue a measurement value acquisition command to the measurement value acquisition unit;

a measurement value storage unit configured to store the pressure measurement value;

a pipeline network division unit configured to divide the pipeline network into sub-networks at installation positions of a fluid supply device, a fluid consumption device, and the pressure gauge installed on a pipeline route in the pipeline network with respect to the pipeline network;

a sub-network model generation unit configured to generate a sub-network model with respect to each of the sub-networks;

a sub-network model storage unit configured to store the sub-network model;

a pressure/flow rate calculation unit configured to calculate a flow of fluid from the pressure measurement value and the sub-network model in a shared sub-network by using the pressure measurement value as a calculation condition at an end of the shared sub-network, with respect to the shared sub-network, and output a pressure calculation value at a pressure measurement point;

a calculation value storage unit configured to store the pressure calculation value;

a measurement value/calculation value comparison unit configured to subtract the pressure calculation value from the pressure measurement value and subtract the pressure calculation value from the pressure measurement value at the shared pressure measurement point included in the sub-network, with respect to each of the sub-networks, and output a subtraction result;

a measurement value/calculation value comparison result history storage unit configured to store a comparison result history which is data constituted in association with the sub-network, the shared pressure measurement point included in the sub-network, an acquisition time of the pressure measurement value, and the subtraction result;

a fluid leakage occurrence/device clogging progress degree estimation unit configured to estimate a progress degree of fluid leakage occurrence and device clogging with respect to each of the sub-networks, based on the comparison result history, and output a progress degree estimation result;

a fluid leakage occurrence/device clogging progress degree display unit comprising a display device and configured to display, on the display device, a progress degree of fluid leakage occurrence/device clogging with respect to each of the sub-networks by using the progress degree estimation result; and a diagnosis completion determination unit comprising an input device and configured to complete pipeline network diagnosis processing when a diagnosis completion command is input from the input device wherein the pressure gauge includes a plurality of pressure gauges, and each of the sub-networks includes at least one of the plurality of pressure gauges which is different from pressure gauges arranged in other sub-networks.

* * * * *